United States Patent
Rubanovich et al.

(10) Patent No.: US 9,043,700 B2
(45) Date of Patent: May 26, 2015

(54) HANDHELD ELECTRONIC DEVICE AND ASSOCIATED METHOD PROVIDING DISAMBIGUATION OF AN AMBIGUOUS INPUT AND SELECTIVELY PROVIDING PREDICTION OF FUTURE CHARACTERS

(75) Inventors: Dan Rubanovich, Waterloo (CA); Vadim Fux, Waterloo (CA); Alexander Kornilovsky, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 2300 days.

(21) Appl. No.: 11/848,850

(22) Filed: Aug. 31, 2007

(65) Prior Publication Data

US 2009/0063962 A1    Mar. 5, 2009

(51) Int. Cl.
G06F 17/24    (2006.01)
G06F 3/023    (2006.01)
G06F 17/27    (2006.01)
H04M 1/725   (2006.01)

(52) U.S. Cl.
CPC ............ *G06F 3/0237* (2013.01); *G06F 17/276* (2013.01); *H04M 1/72519* (2013.01); *H04M 2250/22* (2013.01); *H04M 2250/70* (2013.01)
USPC ........................................................ 715/256

(58) Field of Classification Search
USPC ........................................................ 715/256
See application file for complete search history.

(56) References Cited

U.S. PATENT DOCUMENTS

| | | | |
|---|---|---|---|
| 6,011,554 A | 1/2000 | King et al. | |
| 6,032,053 A | 2/2000 | Schroeder et al. | |
| 6,307,549 B1 | 10/2001 | King et al. | |
| 6,734,881 B1 * | 5/2004 | Will ............................... | 715/811 |
| 7,712,053 B2 | 5/2010 | Bradford et al. | |
| 8,035,618 B2 | 10/2011 | Rubanovich et al. | |
| 2004/0021691 A1 | 2/2004 | Dostie et al. | |
| 2004/0177179 A1 | 9/2004 | Koivuniemi | |
| 2006/0007121 A1 | 1/2006 | Fux | |
| 2006/0044278 A1 | 3/2006 | Fux | |
| 2006/0206815 A1 * | 9/2006 | Pathiyal et al. ............... | 715/533 |
| 2008/0138135 A1 | 6/2008 | Gutowitz | |

(Continued)

FOREIGN PATENT DOCUMENTS

| | | |
|---|---|---|
| EP | 1130503 | 9/2001 |
| EP | 1638014 | 3/2006 |

(Continued)

OTHER PUBLICATIONS

Summons to Attend Oral Proceedings, issued by European Patent Office, mailed May 28, 2013, in European Patent Application No. 07115471.0 (7 pages).

(Continued)

*Primary Examiner* — Adam M Queler
*Assistant Examiner* — Tionna Burke
(74) *Attorney, Agent, or Firm* — Fish & Richardson P.C.

(57) ABSTRACT

A handheld electronic device includes a reduced QWERTY keyboard and is enabled with disambiguation software and prediction software. In response to an ambiguous input, the system provides one or more disambiguated interpretations of the ambiguous input. In some circumstances, the system can additionally provide one or more completions, i.e., predictions of future characters. However, in other circumstances the outputting of completions of an ambiguous input can be suppressed in order to avoid distracting the user and to provide more meaningful results to the user.

6 Claims, 8 Drawing Sheets

(56) References Cited

U.S. PATENT DOCUMENTS

2008/0291059 A1 11/2008 Longe
2009/0063962 A1 3/2009 Rubanovich et al.

FOREIGN PATENT DOCUMENTS

GB 2396940 7/2004
WO 00/62150 10/2000
WO 2006/080935 A1 8/2006

OTHER PUBLICATIONS

Communication Pursuant to Article 94(3) EPC, issued by European Patent Office, mailed Nov. 18, 2008, in European Patent Application No. 07115471.0 (7 pages).
Extended European Search Report, issued by European Patent Office, mailed May 8, 2008, in European Patent Application No. 07115471.0 (7 pages).
Office Action, issued by Canadian Intellectual Property Office, mailed Aug. 5, 2013, in Canadian Patent Application No. 2,639,219 (4 pages).
Office Action, issued by Canadian Intellectual Property Office, mailed Aug. 18, 2011, in Canadian Patent Application No. 2,639,219 (4 pages).
Office Action, issued by Canadian Intellectual Property Office, mailed Aug. 6, 2010, in Canadian Patent Application No. 2,639,219 (4 pages).
Office Action issued in U.S. Appl. No. 11/848,827 on Jul. 1, 2010; 13 pages.
Office Action issued in U.S. Appl. No. 11/848,827 on Dec. 10, 2010; 13 pages.
Notice of Allowance issued in U.S. Appl. No. 11/848,827 on Jun. 10, 2011; 5 pages.
Office Action issued in U.S. Appl. No. 13,225,956 on Sep. 6, 2013; 22 pages.
Office Action issued in U.S. Appl. No. 13,225,956 on Feb. 27, 2014; 19 pages.
Notice of Allowance issued in U.S. Appl. No. 13,225,956 on Jun. 10, 2014; 5 pages.
Office Action issued in Canadian Application No. 2,639,224 on Sep. 9, 2011; 4 pages.
Office Action issued in Canadian Application No. 2,639,224 on Mar. 29, 2011; 4 pages.
Extended European Search Report issued in European Application No. 07115472.8 on Apr. 14, 2008; 7 pages.
Communication Pursuant to Article 94(3) EPC issued in European Application No. 07115472.8 on Oct. 8, 2009; 6 pages.
Summons to Attend Oral Proceedings Pursuant to Rule 115(1) EPC issued in European Application No. 07115472.8 on Aug. 20, 2012; 8 pages.
Summons to Attend Oral Proceedings Pursuant to Rule 115(1) EPC issued in European Application No. 07115472.8 on Sep. 19, 2012; 7 pages.
Decision to Refuse a European Patent Application issued in European Application No. 07115472.8 on Oct. 15, 2012; 7 pages.
Commencement of Proceedings before the Board of Appeals issued in European Application No. 07115472.8 on Mar. 13, 2013; 4 pages.

\* cited by examiner

HANDHELD ELECTRONIC DEVICE AND ASSOCIATED METHOD PROVIDING DISAMBIGUATION OF AN AMBIGUOUS INPUT AND SELECTIVELY PROVIDING PREDICTION OF FUTURE CHARACTERS

BACKGROUND

1. Field

The disclosed and claimed concept relates generally to handheld electronic devices and, more particularly, to a handheld electronic device and method that provide disambiguation of an ambiguous input and that selectively provide prediction of future characters.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

In order to reduce their size, some handheld electronic devices have been provided with keypads wherein at least some of the keys each have a plurality of characters such as Latin letters assigned thereto. During a text entry operation or other operation using such a keypad, an actuation of a key having a plurality of characters assigned thereto will be ambiguous. Such devices are usually configured with some type of disambiguation routine that is executable thereon and that resolves the ambiguity of the input. Disambiguation routines can include multi-tap routines and dictionary-based routines, by way of example.

Some handheld electronic devices additionally include a prediction function wherein, in response to a text input, the device may output one or more completions. That is, a prediction routine will assume that the current input is the initial portion of a longer desired input, such as a longer word, and will provide an indication to the user that the longer word can be input by simply selecting the completion, thereby saving the user keystrokes.

While some devices have sought to provide both disambiguation results and prediction results, i.e., completions, such devices have not been without limitation. In some circumstances, the wide variety of possible disambiguation and prediction results can cause the user to become confused, thereby requiring even more attention and effort by the user. It thus would be desirable to provide an improved handheld electronic device and method that overcome these and other shortcomings.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
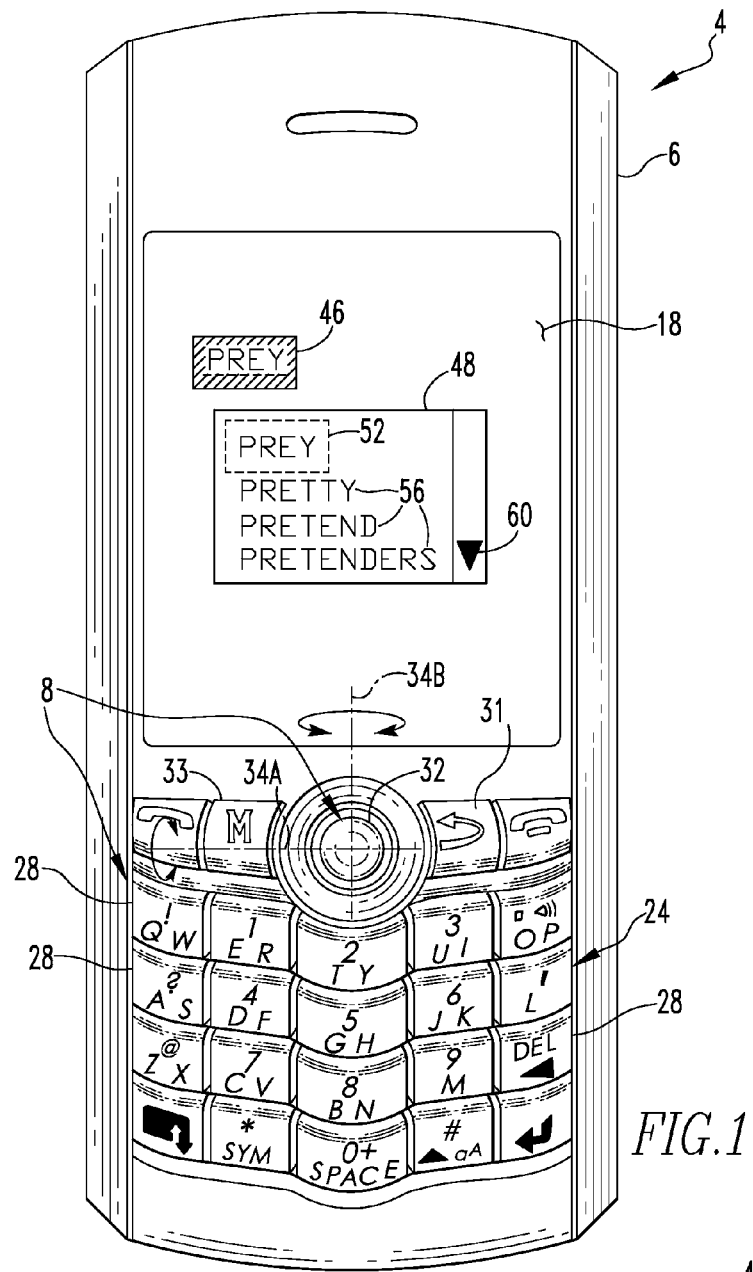
FIG. 1 is a top plan view of an improved handheld electronic device in accordance with the disclosed and claimed concept.
Figure 2:
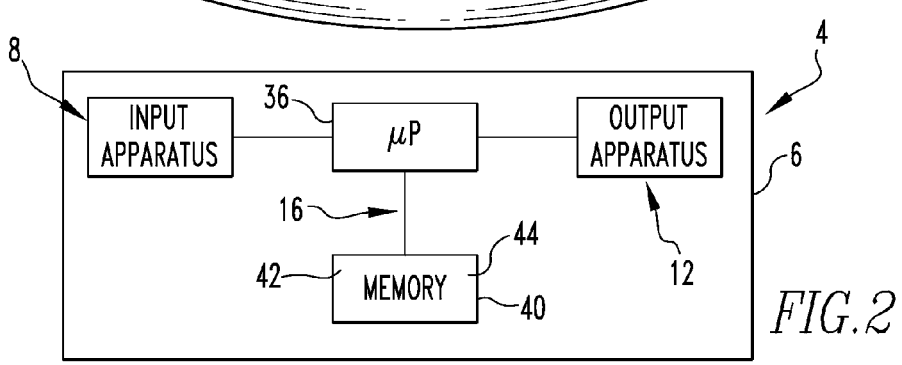
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be seen in FIG. 2, the processor apparatus 16 comprises a processor 36 and a memory 40. The processor 36 may be, for instance and without limitation, a microprocessor (µP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. As will be explained in greater detail below, the routines 44 include a text disambiguation routine 44 and a text prediction routine 44, as well as other routines. The memory 40 also has stored therein a dictionary 42 or other linguistic data source that is used by the disambiguation and prediction routines 44 to provide responses to ambiguous text inputs.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of characters assigned thereto, with at least some of the characters being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

Figure 8:
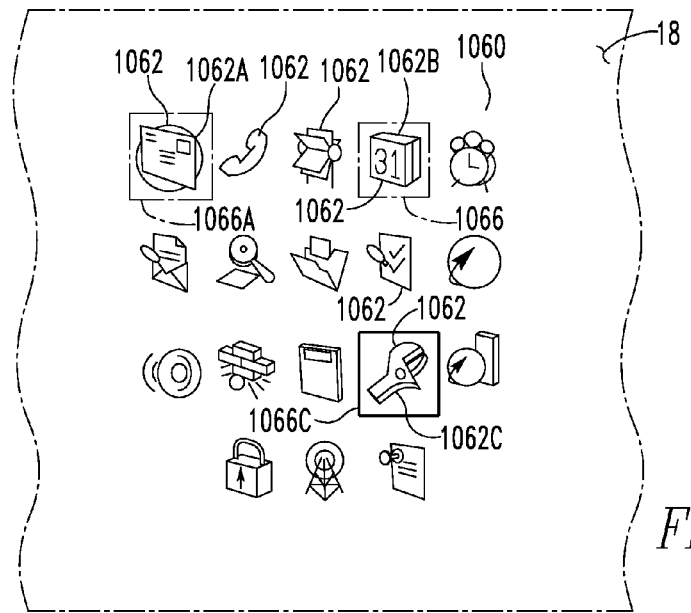
FIG. 8 is an exemplary home screen that can be visually output on the handheld electronic device.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at any logical location within any portion of the logical menu tree except, perhaps, at a home screen such as is depicted in FIG. 8. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Figure 9:
FIG. 9 depicts an exemplary menu that can be output on the handheld electronic device of FIG. 1.

Another of the keys 28 is a <MENU> key 33 which, when actuated, provides to the processor apparatus 16 an input that causes the GUI 44 to generate and output on the display 18 a menu such as is depicted in FIG. 9. Such a menu is appropriate to the user's current logical location within the logical menu tree, as will be described in greater detail below.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines 44, for example, as selection inputs, delimiter inputs, or other inputs.

As mentioned above, the routines 44 comprise a disambiguation routine 44 and a prediction routine 44 that are executable on the processor 36 in, for example, a text input environment. In response to an ambiguous text input, the disambiguation routine 44 provides one or more disambiguated interpretations of the input. With respect to the same ambiguous input, the prediction routine 44 is operable to provide one or more completions of the ambiguous input. That is, the prediction routine 44 operates upon the assumption that the ambiguous input is an initial portion of a larger entry that is as yet incomplete, and the prediction routine 44 causes the outputting of proposed objects, i.e., completions, which upon selection cause the larger entry to be completed without typing the needed additional textual characters. In the present exemplary embodiment, the completions are depicted in the form of complete words that are each longer than the input, i.e., each completion has a greater number of characters than the quantity of character keystrokes of the ambiguous input. In other embodiments not depicted herein, the completions potentially could take other forms, such as additional characters that could be appended to a disambiguated interpretation of the ambiguous input, and the like, without limitation.

In response to an ambiguous text input, the disambiguation routine 44 and the prediction routine 44 can provide disambiguated interpretations and completions, respectively, of the ambiguous text input that can be output simultaneously on the display 18. For example, the display 18 of FIG. 1 depicts the output after the ambiguous input <OP> <ER> <ER> <TY> when the user is seeking to enter the name "Pretoria". In response thereto, the GUI 44 outputs on the display 18 a text input component 46 and a lookup component 48. The text input component 46 is the text that is being input at a particular location in a document, such as an email. The lookup component 48 includes a number of disambiguated interpretations 52 of the ambiguous input and/or a number of completions 56 of the ambiguous input.

The exemplary lookup component 48 of FIG. 1 includes a single disambiguated interpretation 52 "prey", which is itself a complete word and has the same number of characters as character keystrokes of the ambiguous input. The lookup component 48 of FIG. 1 additionally has a number of completions 56 which are the complete words "pretty", "pretend", and "pretenders", all of which have a greater number of characters than the number of character keystrokes of the ambiguous input. An arrow 60 in the lookup component 48 indicates to a user that additional disambiguated interpretations 52 and/or completions 56 are available in response to a downward scrolling input with the track ball 32. If instead of wishing to enter the word "Pretoria" the user had actually intended to enter the word "pretend", the user could at this point simply provide a downward scrolling input until the completion 56 "pretend" is highlighted, and could then translate the track ball 32 or provide another appropriate input to select the completion 56 "pretend" and to cause it to be inserted in the text input component 46 in place of the word "prey".

Figure 3:
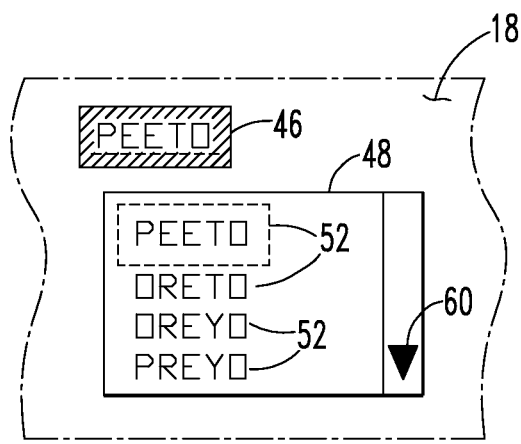
FIG. 3 depicts an output during an exemplary text input operation.

FIG. 3 depicts an exemplary output on the display 18 after the user has additionally actuated the <OP> key 28 in the user's efforts to input the word "Pretoria". The exemplary lookup component 48 in FIG. 3 contains only disambiguated interpretations 52 of the ambiguous input <OP> <ER> <ER> <TY> <OP> without any completions 56 of the ambiguous input since the prediction routine 44 was unable to find a longer word in the dictionary 42 that begins with any character permutation of the ambiguous input, meaning that the dictionary 42 does not include the word "Pretoria". Furthermore, it appears that the disambiguation routine 44 was unable to resolve the ambiguous input into a word, and thus the disambiguated interpretations 52 in FIG. 3 are strings of characters that correspond with the ambiguous input and from which the user may choose if an appropriate string of characters is shown.

Since the user is seeking to enter the word "Pretoria", the user would be looking for a disambiguation 52 comprising the characters "PRETO", after which the user could actuate the keys 28 <ER> <UI> <AS> in order to complete the entry of "Pretoria". However, the lookup component 48 of FIG. 3 depicts no such string of characters. At this point, the user can provide scrolling inputs with the track ball 32 in a downward direction to see if the desired string of characters is available. This may require considerable time, attention, and effort by the user. Alternatively, the user may simply press a <BACKSPACE> or other appropriate key to delete the most recent character keystroke <OP>, which advantageously will result in the exemplary output depicted in FIG. 4. Specifically, it can be seen that the lookup component 48 of FIG. 4 advantageously includes only disambiguated interpretations 52 of the input without any proposed completions thereof 56. That is, FIGS. 1 and 4 both depict a lookup component 48 reflective of the same ambiguous input, i.e., <OP> <ER> <ER> <TY>. However, the completions 56 that are depicted in the lookup component 48 of FIG. 1 are advantageously absent from the lookup component 48 of FIG. 4. This is because the most recent keystroke in FIG. 4 was, for example, an actuation of the <BACKSPACE> key.

Figure 4:
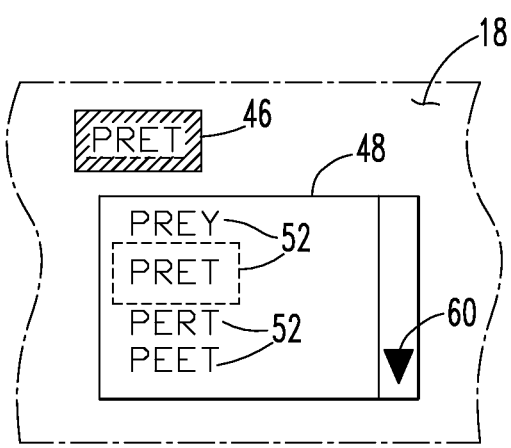
FIG. 4 depicts another output during the exemplary text input operation.

The completions 56 that ordinarily could be provided in response to the ambiguous input <OP> <ER> <ER> <TY>, i.e., the words "pretty" "pretend" and "pretenders", are advantageously suppressed from the lookup component 48 of FIG. 4 for a number of reasons. For example, the completions 56 that were output in FIG. 1 were not selected by the user, which would suggest that they were not the words that were intended by the user, and thus are desirably suppressed in order to avoid occupying space on the display 18 and distracting the user. Additionally, the fact that the user actuated the <BACKSPACE> key suggests that the lookup component 48 of FIG. 3 did not include an immediately apparent disambiguated interpretation 52 that was desired by the user. This, in turn, would suggest that the user actuated the <BACKSPACE> key in order to select a disambiguated interpretation 52 of the ambiguous input <OP> <ER> <ER> <TY>. Such a selection would lock the characters of the selected disambiguated interpretation 52 in order to focus the disambiguation routine 44 in future character keystrokes while inputting "Pretoria". Thus, the outputting of completions 56 in FIG. 4 along with the desired disambiguated interpretations 52 would be unnecessary and would distract the user during the selection task.

It thus can be seen that an actuation of a <BACKSPACE> key, for example, during an ambiguous text input advantageously results in a lookup component 48 that comprises disambiguated interpretations 56 of the ambiguous text input and that is free of completions 56 of the ambiguous text input. This beneficially enables a user to select a desired disambiguated interpretation 52 of the ambiguous input without the distraction that would be caused by completions 56 thereof which the user has already indicated were not what the user wanted by the user's non-selection thereof. Such a suppression of completions 56 from the lookup component 48 upon detecting an actuation of the <BACKSPACE> key advantageously facilitates input by providing disambiguated interpretations 52 in the lookup component 48 without the need to scroll past undesired completions 56 and without the distraction thereof. It is understood that the aforementioned <BACKSPACE> key is intended to be exemplary, and such a suppression of completions 56 could alternatively or additionally be accomplished with another predetermined input, such as an actuation of a <DELETE> key, an <ESCAPE> key, or other appropriate input.

Further in accordance with the disclosed and claimed concept, completions 56 of the ambiguous text input can again be output on the display 18 upon detecting another character keystroke subsequent to detecting the aforementioned actuation of the <BACKSPACE> key. The re-enablement of the prediction routine 44 occurs with the first character keystroke after actuation of the <BACKSPACE> key regardless of whether in the intervening period the user selected one of the disambiguated interpretations 52. This advantageously allows completions 56 to be provided if, for instance, they exist for the given ambiguous input, and this allows the user to select, for example, a correct completion 56 that the user may have missed earlier.

Figure 5:
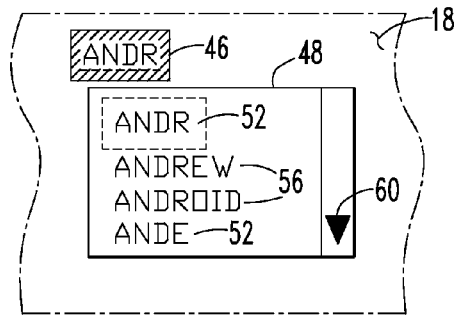
FIG. 5 depicts an output during another exemplary text input operation.

Selective suppression of completions can also be advantageously provided during certain types of editing operations. For instance, FIG. 5 depicts an editing operation on the existing word "and", with the editing operation comprising adding the keystroke <ER> at a terminal end of the word "and". The addition of character keystrokes at the end of an existing object such as a word will result in reinitiation of the input session that generated object. That is, the additional character keystrokes are added to the terminal end of the string of character keystrokes that resulted in the object, i.e., the word, being edited, and the GUI 44 outputs a lookup component 48 that includes disambiguated interpretations 52 as well as completions 56 to the extent that they might exist.

By way of example, FIG. 5 depicts the disambiguated interpretation 52 "andr" and selectable completions 56 "Andrew" and "android", for example. It is noted that in such a situation the preexisting characters "and" may or may not be locked depending upon the specific configuration of the handheld electronic device 4.

It is noted, however, that character keystrokes inserted at the beginning of an existing word or at a location within the existing word can be indicative of a number of scenarios. In one scenario, the user is seeking to add keystrokes to make the existing word longer. In another scenario, the user is intending to either insert a new word in front of the existing word or to split the existing word into two words with one or more additional characters being input.

The quantity of disambiguated interpretations 52 and completions 56 for all such scenarios can be excessive and, if output, could be confusing to the user and/or can provide results other than what is intended by the user. For example, if in front of the existing word "and" the user inserts the character keystroke <CV>, the user potentially could be intending to type the longer word "command". Additionally, the user potentially could be intending to insert the word "cold" in front of the word "and", for example. The quantity of possible completions 56 for all such possible scenarios could be undesirably great when added to the disambiguated interpretations 52 of the edited input that are being generated by the disambiguation routine 44. Advantageously, therefore, in a situation where a user inserts a character keystroke at the beginning of an existing word or at a location within an existing word, the resultant lookup component 48 provides disambiguated interpretations 52 of the edited ambiguous input and is free of completions 56 thereof. This advantageously avoids distracting the user and provides more meaningful results, i.e., disambiguated interpretations 52 of what the user has actually typed. It also advantageously avoids unnecessary effort by the processor 36.

Figure 6:
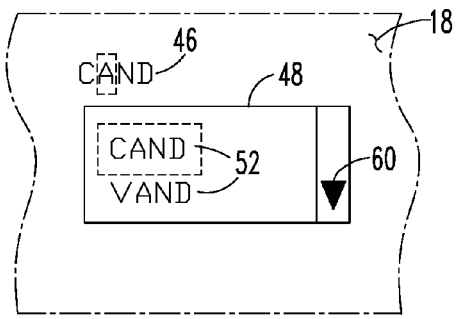
FIG. 6 depicts an output during another exemplary text input operation.
Figure 7:
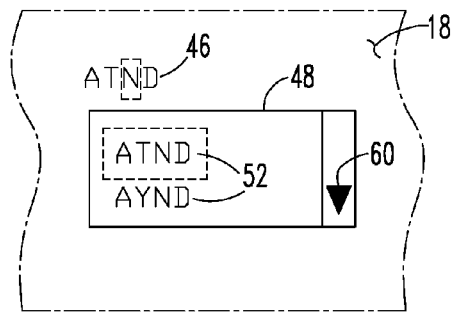
FIG. 7 depicts an output during another exemplary text input operation.

For example, FIG. 6 depicts the situation where the user has inserted the character keystroke <CV> at the beginning of the existing word "and" it can be seen that the lookup component 48 comprises only disambiguated interpretations 52 of the edited ambiguous input. Similarly, FIG. 7 depicts a situation where the user has inserted the character keystroke <TY> immediately in front of the letter "n" of the existing word "and" being edited. Again, the lookup component 48 comprises only disambiguated interpretations 52 of the edited ambiguous input and is free of completions 56 thereof.

As such, when additional character keystrokes are being added to an existing object such as a word at a location other than at the end of the object, completions 56 of the edited ambiguous input are suppressed from the resulting lookup component 48. This advantageously avoids distraction to the user and avoids the outputting of large numbers of completions 56 which, by their sheer quantity, are each individually of a relatively low likelihood of being what the user intended. This likewise facilitates input on the handheld electronic device.

While it is stated herein that in certain circumstances a lookup component 48 can be free of completions 56 of an ambiguous input, it is understood that such a result can occur in any of a variety of situations. For instance, in such a situation the prediction routine 44 might be at least temporarily disabled. Alternatively, the prediction routine 44 might generate completions 56, but such completions 56 might be suppressed from the lookup component 48. Such a suppression of generated completions 56 could occur, for example, by applying a preference to disambiguated interpretations 52 of the ambiguous input or by simply eliminating from the lookup component 48 any such generated completion 56.

An exemplary home screen output that can be visually output on the display 18 is depicted in FIG. 8 as including a plurality of icons 1062 that are selectable by the user for the purpose of, for example, initiating the execution on the processor apparatus 16 of a routine 44 that is represented by an icon 1062. The track ball 32 is rotatable to provide, for example, navigational inputs among the icons 1062.

For example, FIG. 8 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In the present example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine 44 is active on the handheld electronic device 4 as inputs that can be employed by such routine 44. For example, the GUI 44 that is active on the handheld electronic device 4 in FIG. 8 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 44 likely would resolve such an oblique rotation of the track ball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the handheld electronic device 4 is on the icon 1062C. As such, a translation of the track ball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the track ball 32 is rotatable to provide navigational and other inputs in multiple directions, assuming that the routine 44 that is currently active on the handheld electronic device 4 can employ such navigational or other inputs in a plurality of directions, and can also be translated to provide a selection input or other input.

Figure 10:
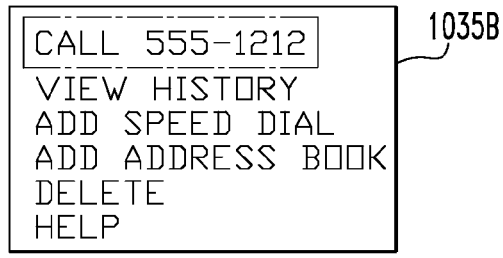
FIG. 10 depicts another exemplary menu.

As mentioned above, FIG. 9 depicts an exemplary menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion, FIG. 10 depicts another exemplary menu 1035B that would be depicted if the user's current logical location within the logical menu tree was within a telephone routine 44.

Rotational movement inputs from the track ball 32 could be employed to navigate among, for example, the menus 1035A and 1035B. For instance, after an actuation of the <MENU> key 33 and an outputting by the GUI 44 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 44 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

Figure 11:
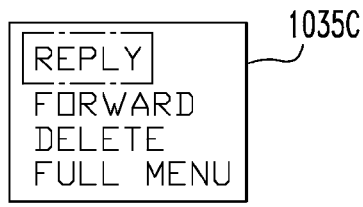
FIG. 11 depicts an exemplary reduced menu.

By way of example, if instead of actuating the <MENU> key 33 to generate the menu 1035A the user translated the track ball 32, the GUI 44 would generate and output on the display the reduced menu 1035C that is depicted generally in FIG. 11. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track ball 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the handheld electronic device 4, including those that might not be represented by icons 1062 on the home screen.

Figure 12:
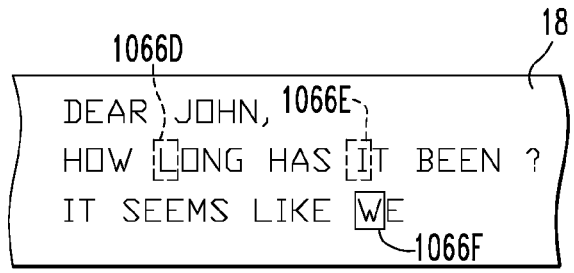
FIG. 12 is an output such as could occur during another exemplary text entry or text editing operation.

FIG. 12 depicts a quantity of text that is output on the display 18, such as during a text entry operation or during a text editing operation, for example. The indicator 1066 is depicted in FIG. 12 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 8, the cursor 1066 was moved among the letters "L", "I", and "W" through the use of horizontal and vertical navigational inputs resulting from rotations of the track ball 32. In the example of FIG. 12, however, each rotation of the track ball 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 13:
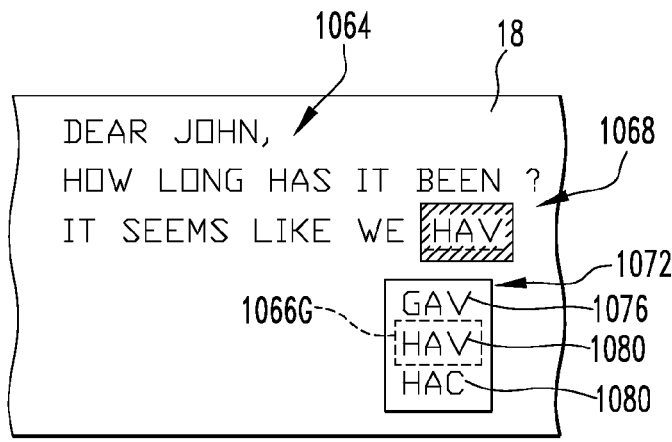
FIG. 13 is an output during another exemplary text entry operation.

FIG. 13 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 13 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 13. Since such a rotation of the track ball 32 resulted in the first variant 1080 "HAV" being highlighted with the indicator 1066G, the text component 1068 likewise includes the text "HAV" immediately preceding a cursor 1084A.

Figure 14:
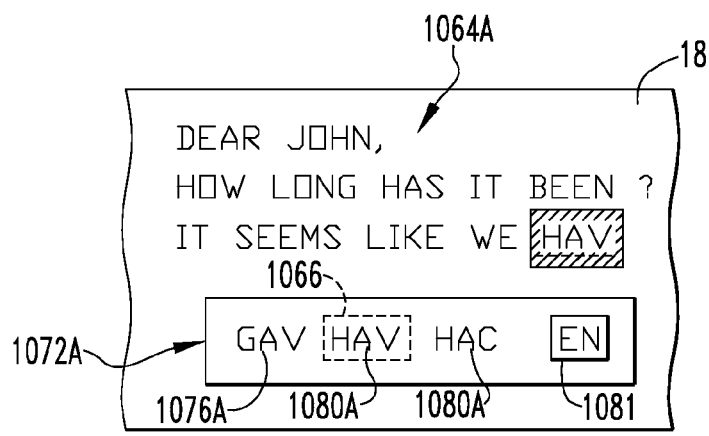
FIG. 14 is an alternative output during the exemplary text entry operation of FIG. 13.

FIG. 14 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 13 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine 44 active at any time on the handheld electronic device 4. The track ball 32 enables such navigational, strolling, selection, and other inputs to be intuitively generated by the user through rotations of the track ball 32 in directions appropriate to the active routine 44, such as might be indicated on the display 18.

It can further be seen from FIG. 14 that the variant component 1072A additionally includes a value 1081 that is indicative of the language into which the disambiguation routine 44 will interpret ambiguous text input. In the example depicted in FIG. 14, the language is English.

Figure 15:
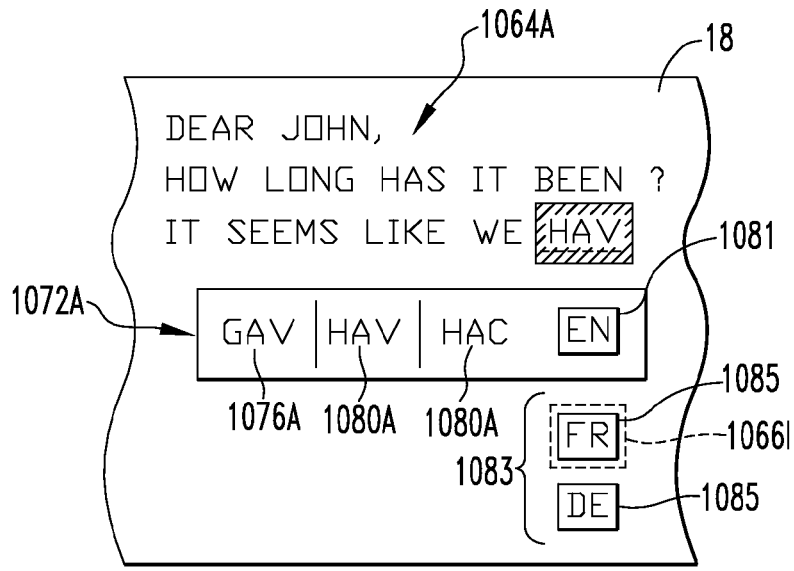
FIG. 15 is another output during another part of the exemplary text entry operation of FIG. 13.

As can be seen in FIG. 15, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 32 again, by continuing to enter text, or in other fashions. It thus can be understood from FIG. 14 and FIG. 15 that the track ball 32 can be rotated to provide horizontal scrolling inputs and, when appropriate, to additionally provide vertical scrolling inputs and, when appropriate, to additionally provide selection inputs, for example.

Figure 16:
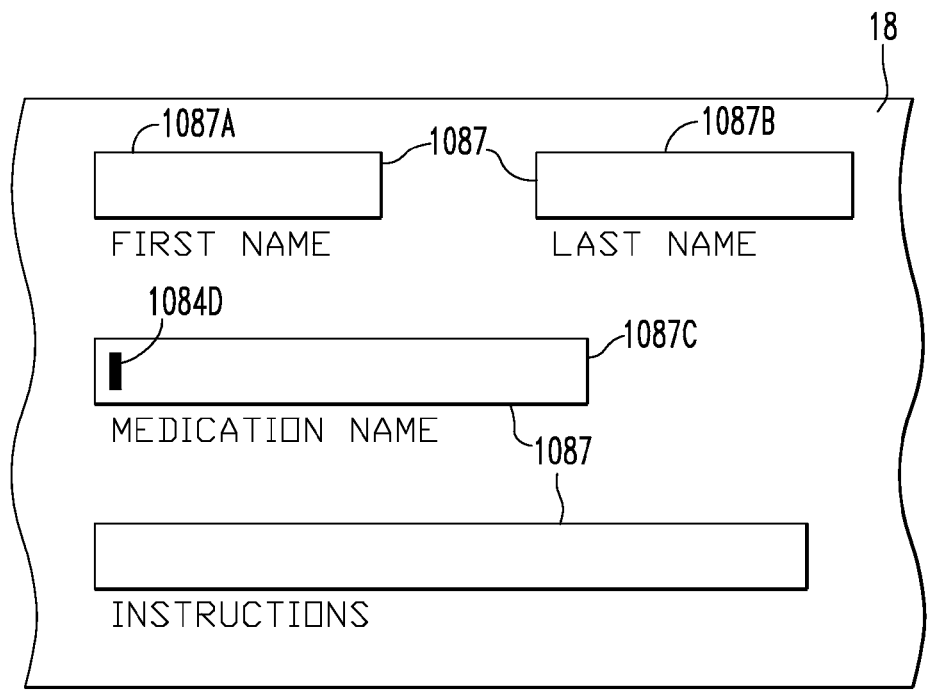
FIG. 16 is an exemplary output during a data entry operation.

FIG. 16 depicts another exemplary output on the display 18 such as might be employed by a data entry routine 44. The exemplary output of FIG. 16 comprises a plurality of input fields 1087 with corresponding descriptions. A cursor 1084D, when disposed within one of the input fields 1087, indicates to the user that an input focus of the handheld electronic device 4 is on that input field 1087. That is, data such as text, numbers, symbols, and the like, will be entered into whichever input field 1087 is active, i.e., is the subject of the input focus. It is understood that the handheld electronic device 4 might perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 could include the input fields 1087A, 1087B, and 1087C. FIG. 16 depicts the cursor 1084D as being disposed in the input field 1087C, indicating that the input field 1087C is the subject of the input focus of the handheld electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 17:
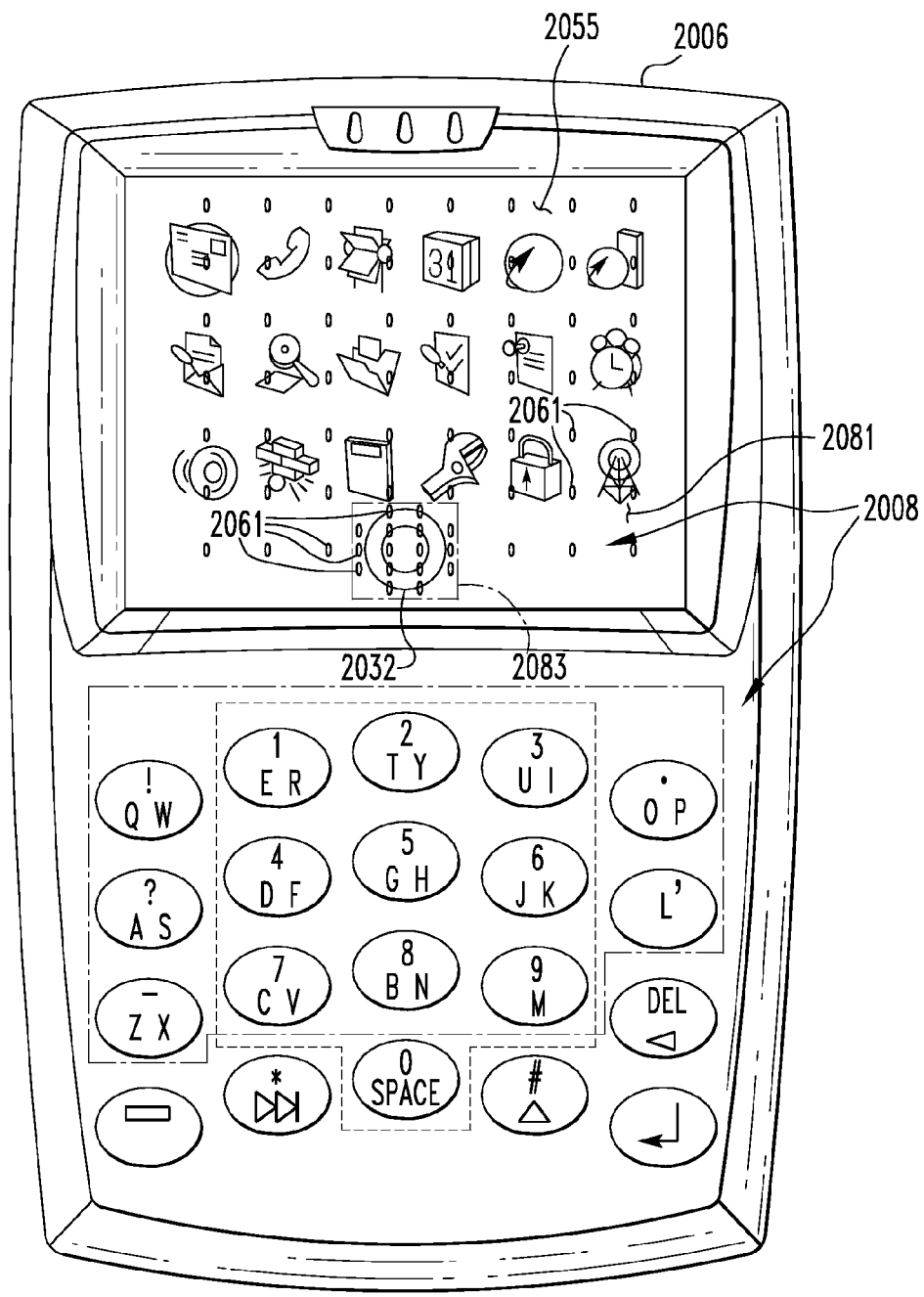
FIG. 17 is a top plan view of an improved handheld electronic device in accordance with another embodiment of the disclosed and claimed concept.
Figure 18:
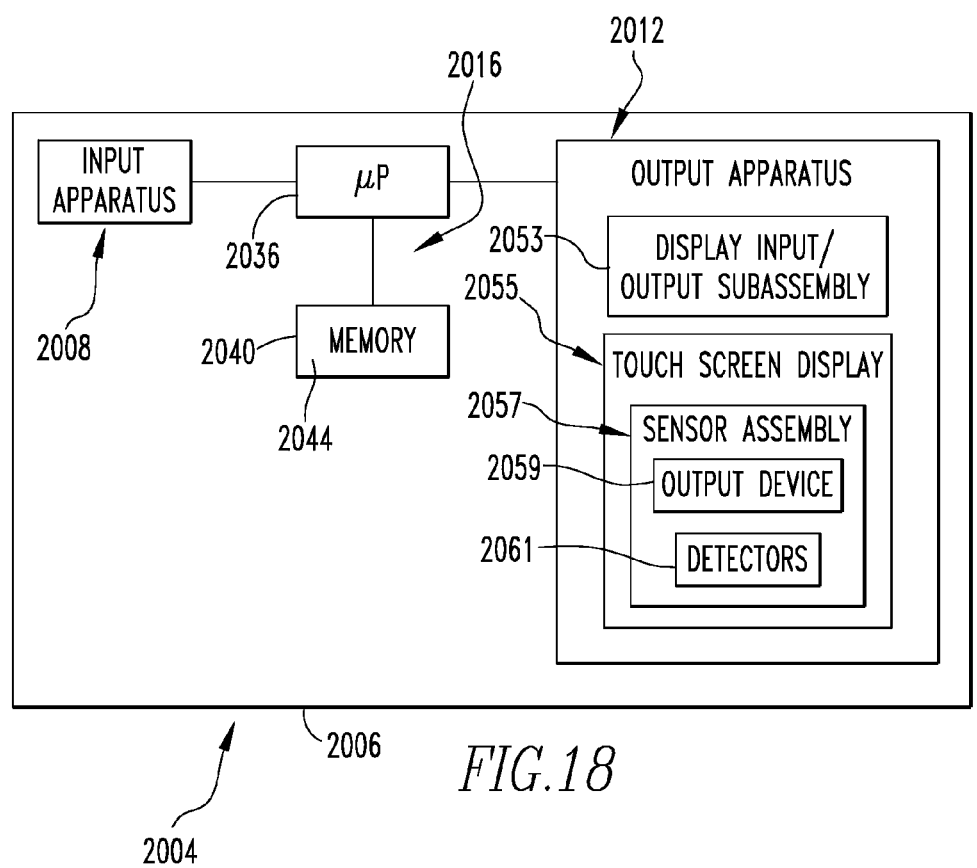
FIG. 18 is a schematic depiction of the improved handheld electronic device of FIG. 17.

An improved handheld electronic device 2004 in accordance with still another embodiment of the disclosed and claimed concept is depicted generally in FIG. 17 and FIG. 18. The handheld electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the handheld electronic device 4 can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in configuration and function to the handheld electronic device 4, except that the handheld electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 17, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 32 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device that comprises an output apparatus, an input apparatus comprising a plurality of input members, and a processor apparatus comprising a memory having stored therein a number of routines, one of the routines being a prediction routine that is executable on the processor apparatus and is structured, responsive to an input, to output a number of proposed completions of the input, each proposed completion comprising a number of data elements additional to the input, the method comprising:

responsive to an ambiguous text input comprising a plurality of input member actuations, outputting a list comprising a number of disambiguated interpretations and a number of proposed completions of the ambiguous text input; and directly responsive to a deletion input, outputting another list comprising a number of disambiguated interpretations of the ambiguous text input as modified by the deletion input, the another list being free of proposed completions.

2. The method of claim 1, further comprising detecting another input member actuation, and outputting a number of disambiguated interpretations and a number of proposed completions of the ambiguous text input as modified by the deletion input plus the another input member actuation.

3. The method of claim 2, further comprising detecting as the another input member actuation an input appended to the end of the ambiguous text input as modified by the deletion input.

4. A handheld electronic device comprising:

a processor apparatus comprising a processor and a memory having stored therein a number of routines, one of the routines being a prediction routine that is executable on the processor and is structured, responsive to an input, to output a number of proposed completions of the input, each proposed completion comprising a number of data elements additional to the input;

an input apparatus comprising a plurality of input members and being structured to provide input to the processor apparatus;

an output apparatus structured to receive output signals from the processor apparatus;

the memory further having stored therein a number of routines which, when executed on the processor, cause the handheld electronic device to perform operations comprising:

responsive to an ambiguous text input comprising a plurality of input member actuations, outputting a list comprising a number of disambiguated interpretations and a number of proposed completions of the ambiguous text input; and directly responsive to a deletion input, outputting another list comprising a number of disambiguated interpretations of the ambiguous text input as modified by the deletion input, the another list being free of proposed completions.

5. The handheld electronic device of claim 4 wherein the operations further comprise detecting another input member actuation, and outputting a number of disambiguated interpretations and a number of proposed completions of the ambiguous text input as modified by the deletion input plus the another input member actuation.

6. The handheld electronic device of claim 5 wherein the operations further comprise detecting as the another input member actuation an input appended to the end of the ambiguous text input as modified by the deletion input.

* * * * *